United States Patent [19]

Leigraf et al.

[11] Patent Number: 5,685,955
[45] Date of Patent: Nov. 11, 1997

[54] METHOD FOR PROCESSING A WEB OF MATERIAL USING INDIVIDUALLY CONTROLLABLE ZONES

[75] Inventors: Reinhard Leigraf, Grefrath; Hans-Rolf Conrad, Dormagen, both of Germany

[73] Assignee: Voith Sulzer Finishing GmbH, Krefeld, Germany

[21] Appl. No.: 563,542

[22] Filed: Nov. 28, 1995

[30] Foreign Application Priority Data

Dec. 1, 1994 [DE] Germany ............... 44 42 746.8

[51] Int. Cl.$^6$ ............... D21G 1/00; G05D 5/00
[52] U.S. Cl. ............... 162/198; 162/262; 162/252; 162/263; 364/471.01; 364/471.02; 364/471.03; 364/469.01; 73/159
[58] Field of Search ............... 162/198, 262, 162/263, 252, DIG. 6, DIG. 10, DIG. 11, 253; 364/469.01, 469.02, 469.03, 471.01, 471.02, 471.03, 472.1, 472.09, 473, 563, 556, 568; 73/159, 73; 118/323, 313, 315, 67, 68

[56] References Cited

U.S. PATENT DOCUMENTS

| | | | |
|---|---|---|---|
| 3,307,215 | 3/1967 | Gerhard et al. | 162/DIG. 10 X |
| 3,713,966 | 1/1973 | Lippke | 162/263 |
| 3,782,873 | 1/1974 | Lynnknowles | 425/141 |
| 3,936,665 | 2/1976 | Donoghue | 364/469 |
| 4,514,913 | 5/1985 | Stephansen | 34/48 |
| 4,903,528 | 2/1990 | Balakrishnan | 73/159 |
| 5,093,795 | 3/1992 | Lewis | 364/71 |
| 5,122,232 | 6/1992 | Lyman et al. | 162/198 |
| 5,262,955 | 11/1993 | Lewis | 364/71 |
| 5,286,348 | 2/1994 | Perin | 162/262 |
| 5,393,378 | 2/1995 | Yakabe et al. | 162/61 |
| 5,534,114 | 7/1996 | Cutright et al. | 162/139 |

FOREIGN PATENT DOCUMENTS

| | | |
|---|---|---|
| 2818011 C2 | 4/1978 | Germany. |
| 3410136 A | 3/1984 | Germany. |
| 42 38 037 | 4/1993 | Germany. |
| 42 39 845 | 5/1993 | Germany. |
| 42 39 270 | 5/1994 | Germany. |
| 2 329 120 | 1/1997 | Germany. |
| 54-139865 | 10/1979 | Japan. |
| 56-128394 | 10/1981 | Japan. |
| 56-128395 | 10/1981 | Japan. |
| 60-209092 | 10/1985 | Japan. |
| 1-67036 | 4/1989 | Japan. |

*Primary Examiner*—Donald E. Czaja
*Assistant Examiner*—Jose A. Fortuna
*Attorney, Agent, or Firm*—Darby & Darby

[57] ABSTRACT

A method and apparatus for processing a longitudinally traveling web of material using a sheet treating device positioned in a transverse direction relative to the web. The sheet treating device having a plurality of individually controllable zones for controlling a target parameter of the web, for example, the thickness, bulk, dampness, smoothness or sheen of the web. In conjunction with the sheetmaking device, a measuring instrument for measuring an actual value of the target parameter is placed downstream of the sheet treating device. An actual profile that is determined by the actual values is compared with a desired profile, and the zones of the sheet treating device are adjusted such that the discrepancies between the two profiles are minimized. To improve the matching of the actual profile to the desired profile even further, the web and/or the sheet treating device are shifted relative to the other in the transverse direction to minimize the discrepancies between the two profiles.

5 Claims, 2 Drawing Sheets

METHOD FOR PROCESSING A WEB OF MATERIAL USING INDIVIDUALLY CONTROLLABLE ZONES

BACKGROUND OF THE INVENTION

1. Field of the Invention

This invention relates generally to a method and apparatus for processing a web of material using a sheet treating device, and more particularly to a method and apparatus for controlling properties of a longitudinally traveling web of material using individually controllable zones extending in a transverse direction along the sheet treating device. An actual profile of a predetermined target parameter is measured in the transverse direction and compared with a desired profile of the target parameter. The individual zones of the sheet treating device, particularly at the border region between two zones, are controlled based upon differences between the actual profile and the desired profile.

2. Discussion of the Related Art

The term "processing a web of material" is to be understood to include those operations which are carried out on a web, or sheet, of material such as paper or plastic, and which are intended to have an effect on the characteristic values or target parameters of the web. For example, these characteristics values include the thickness, bulk, smoothness, sheen, moisture content, basis weight as well as similar characteristics. These parameters can be measured using known measuring instruments and allow use of known sheet treating devices to process the web. For example, calenders or other roller arrangements can be used in which the web is guided through: 1) at least one roll gap; 2) heating devices that act on the web either directly or indirectly using a processing roller; and 3) steam or jet dampeners that have an effect on the moisture content and temperature of the web.

It is known to transversely subdivide sheet treating devices into zones to individually adjust or control, at least in a sectional manner, the characteristics of the processing in the transverse direction. By controlling the characteristics of the individual zones, a strip in the longitudinal direction, which does not have a value corresponding to the target parameter, may be modified to obtain the desired value. The actual parameter profile of the web is adjusted in the transverse direction by changing the controls of the individual zones of the sheet treating device. The profile is adjusted to correspond, as closely as possible, to a predetermined target profile. Regarding the examples above, the moisture, temperature, pressure, etc. can be varied to achieve, as closely as possible, a particular target parameter across the width of the web.

Typically, a cross-sectional profile measurement system monitors the adjustment either continuously or discretely. In the case of a discrete measurement, that is a measurement of the target parameter at various points distributed across the width of the web, the number of measurement points actually measured is significantly larger than the number of zones present. The problem with this type of system is that any discrepancies in the desired value of the parameter of the web, which extends across the edges of two adjacent zones, can only be alleviated by superimposing new discrepancies on the original discrepancies. In this way, a neutralization of the discrepancy is achieved at the location of the original discrepancy, which can be, for example, the border region between the two adjacent zones. However, since the adjustment involves the entire width of the zone, there is a corresponding change of the actual profile in the regions of the zone which were previously closer to the desired value, and which thus exhibited a smaller deviation from the desired value than the new, adjusted value. It is thus possible for an overall worsening of the target parameter's actual profile to occur as a result of an over-correction of the discrepancy in the desired value. This is especially true when the discrepancy is adjacent to a border between two adjacent zones. Therefore, it is desirable to provide a sheet treating device which does not over-compensate for discrepancies in the desired value, especially in the border region between two zones.

SUMMARY OF THE INVENTION

Accordingly, it is an object of the present invention to provide a sheet treating device with an improved method of adjustment of the cross-sectional target parameter profile.

In the improved method, the sheet treating device and the web are shifted relative to each other in the transverse direction to allow a sheet treating device to effect the web so as to minimize the differences between the actual profile and the desired profile.

As a result of this shifting, the sheetmaking device exerts an influence on the web over the entire width of the web. As a result, a new profile value is obtained, which makes it possible to compensate for discrepancies between the desired profile and the actual profile, even in border regions between two adjacent zones. This compensation is achieved in a manner that minimizes the differences between the desired profile and the actual profile.

Preferably, before each shift, each zone is first adjusted to minimize the deviations between the desired profile and the actual profile. This process is similar to previous systems, wherein an approximation of the actual profile is achieved in each zone which is as close as possible to the desired profile of the target parameter. However, in accordance with the present invention, the differences between the actual profile and the desired profile can now be further reduced by shifting one of the web and the sheet treating device relative to the other. However, before shifting, a first least squares value of the discrepancy is determined.

The sheet treating device and web are preferably displaced relative to one another such that a predetermined point of a zone is moved to the location of the greatest difference between the desired profile and the actual profile. Preferably, this point is in the center of a zone. In this way, the center of a zone is shifted to the location of the greatest discrepancy. Frequently, the discrepancy between the desired value and the actual value does not appear as a singular peak, but rather in the form of a continuously increasing curve that is applied across the width of the web. Overall, the balancing or minimizing of the differences between the desired value and the actual value is preferably managed in the center of the zone. However, a different point in the zone that is appropriate for the intended purpose can be used. Either the web or sheet treating device is shifted so that the area of the web which corresponds to the maximum discrepancy between the desired value and the actual value is disposed directly below the preferred point in the zone.

In the preferred method, following the shift: a) a second least squares value between the desired profile and the actual profile is determined, and compared with a first least squares value which was determined before the shift; b) if the second value is smaller than the first value, the location of the greatest discrepancy between the desired profile and actual profile is determined, and the preferred point in the one of the closest zones is shifted to the location of the greatest discrepancy; c) if the second value is larger than the first value, the sheet treating device is repositioned to the previous position; and d) the steps "a" through "c" are repeated until step "c" is satisfied.

As a result of this procedure, the profile which most closely matches the desired profile is derived in an iterative manner, which is achievable because the web and the sheet treating device are shifted relative to each other in the transverse direction.

As a result of the transverse shifting of the web and the sheet treating device, an additional parameter is obtained which can influence the actual profile. This additional parameter now becomes the point of application by which the sheet treating device exerts influence. As a result, the discrepancies between the desired profile and the actual profile are reduced, without the need to simultaneously factor in a worsening or increase in the discrepancies in other regions.

Preferably, the sheet treating device and the web are shifted with respect to each other by at least the width of one zone. In this manner, the entire width of the web is assured of being included in the improved processing.

Preferably, the sheet treating device and the web are shifted in opposite directions by at least the width of one half of a zone with respect to each other. In this way, the sheet treating device and web have a total shifting capacity of one entire zone. This shifting provides an improved reaction speed because of starting from a "neutral position", so that even in the case of discrepancies at the edge of a zone, either the sheet treating device or the web only has to be moved the width of one half of a zone.

There are numerous possibilities for achieving the shifting capability of the web and the sheet treating device. In the preferred embodiment, the web is suspended by a winding and unwinding roller frame, both of which traverse back and forth in a coordinated manner with respect to the sheet treating device. Traversing winding and unwinding roller frames of this type are known per sé. For example, soft calenders, such as roller arrangements with at least one soft roller, are used to prevent the edge of the web from engaging the soft roller's surface. However, unlike the present invention, the target parameter and its adjustment do not play any role in conventional traversing devices.

In an alternate embodiment, the traveling web is stationary in the transverse direction while the sheet treating device is moved transversely with respect to the web's path. In many cases, the sheet treating device is manipulated in the transverse direction more easily than the winding and unwinding roller frames, because the sheet treating device is lighter in weight than the roller frames. As a result, the sheet treating device accelerates more quickly in the transverse direction as compared to the roller frames.

Preferably, the sheet treating device is driven in the transverse direction by an external disk. Using this type of driver, the position of the sheet treating device is easily adjusted relative to the roller frames. In addition, the position of the sheet treating device can be controlled by knowing and controlling the angular positioning of the external disk.

In an alternate embodiment, the sheet treating device is driven by a pinion gear which meshes with a toothed rack and operates in the transverse direction.

In all of the embodiments, a stepping motor is preferably provided for driving the sheet treating device. As a result, a relatively high resolution results when adjusting the sheet treating device's position.

DETAILED DESCRIPTION OF THE PREFERRED EMBODIMENT

Figure 1:
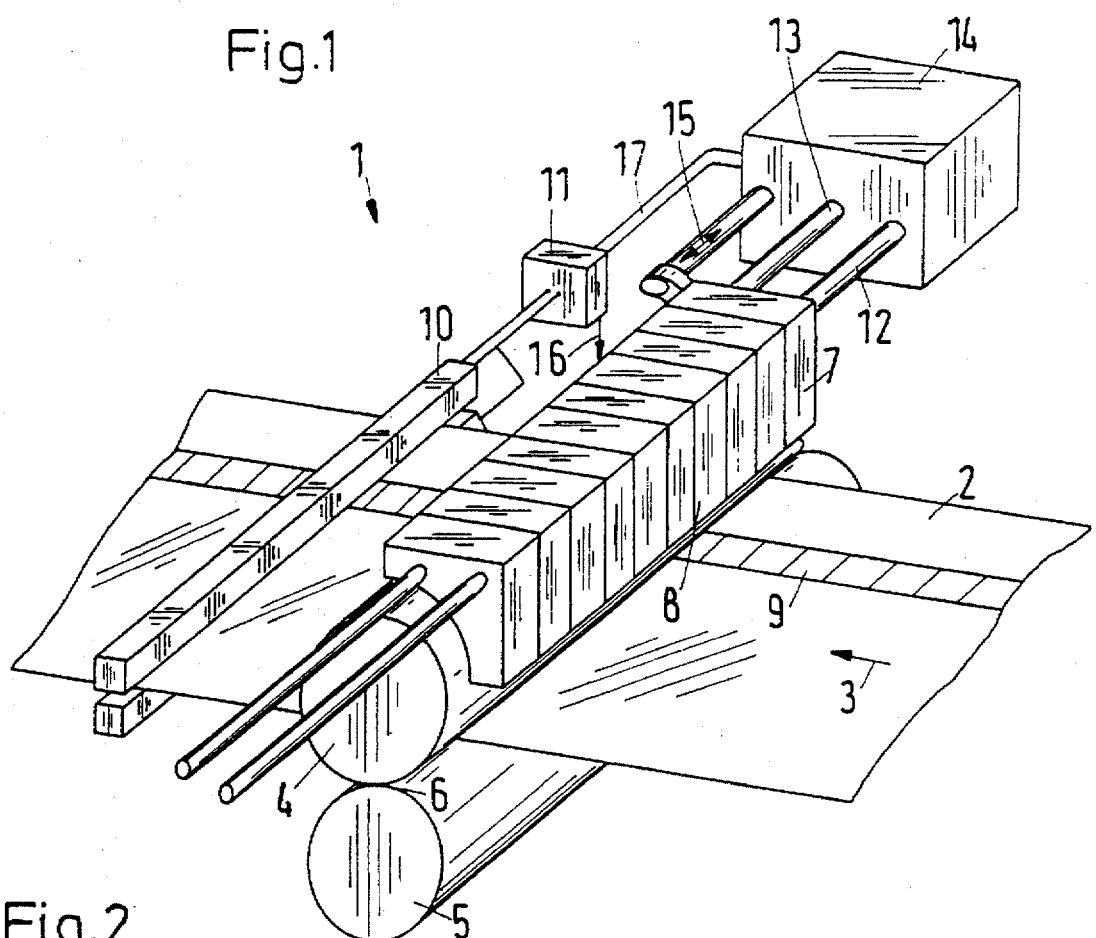
FIG. 1 is a perspective view of a preferred embodiment of an apparatus for processing a longitudinally traveling web of material using a sheet treating device according to the present invention.

Referring to FIG. 1, an apparatus 1 for processing a web of material 2, which is moving longitudinally in the direction of arrow 3, is illustrated. The web 2 is guided through a roller gap 6 that is formed between two rollers 4, 5. As the web 2 passes through the roller gap 6, it is compressed, affecting its thickness and bulk. In addition, depending on the design of the when 4, 5, the surface of the web 2, including the sheen and/or smoothness, is also affected.

In a preferred embodiment, the thickness of the web is adjusted so that it is constant across its width (i.e., the direction perpendicular to arrow 3). A rough setting of the thickness can be achieved if one of the two rollers 4, 5 is configured as an adjustable deflection roller. However, to achieve a finer resolution of the thickness, a processing or sheet treating device 7 is provided which has a local effect on the roller 4 by creating a temperature change. The temperature change is provided, for example, by using hot or cold air jets, infrared heating or an inductive heating of the roller 4. All of these methods of affecting a temperature change are well known in the art. The sheet treating device 7 has a number of zones 8, each of which can be regulated separately from the rest of the zones 8. For example, each zone 8 may have its own air jet, which blows air that has been adjusted to the appropriate temperature onto the surface of the roller 4. One zone 8, therefore, affects a single strip 9 of the web 2, which is cross-hatched in FIG. 1 for clarification.

A stationary measuring bridge instrument 10 measures the effect of the sheet treating device 7 and is positioned downstream of the roller gap 6 in the direction of movement 3 of the web 2. In lieu of the measuring bridge 10 shown in FIG. 1, a traversing measurement sensor can also be provided, which continuously measures the thickness of the web 2 as the sensor is moved back and forth across the web 2 in a transverse direction (i.e., in the direction indicated by arrow 22 in FIG. 2). Regardless of the measuring instrument used, the thickness of the web 2 is measured at a number of points which is greater than the number of zones 8 of the sheet treating device 7.

The measuring bridge 10 is connected with an evaluation device 11, which compares the measured actual value with a predetermined desired value for each measurement point, and calculates the difference between the desired value and the actual value. Based on these differences, zones 8 of the sheet treating device 7 are individually activated to minimize the differences between the actual value and the desired value.

Within any strip 9, significant discrepancies may exist between the desired thickness profile and the actual thickness profile. For example, the thickness of one edge of the strip 9 can increase towards the other edge of the strip 9 in such a way that the greatest difference between the desired thickness value and the actual thickness value is at the edge of the strip 9, which is the border between two adjacent strips. If this thickness differential is corrected at the border area, there will be an automatic worsening or increase in the thickness difference in the remaining regions of the strip 9.

Figure 2:
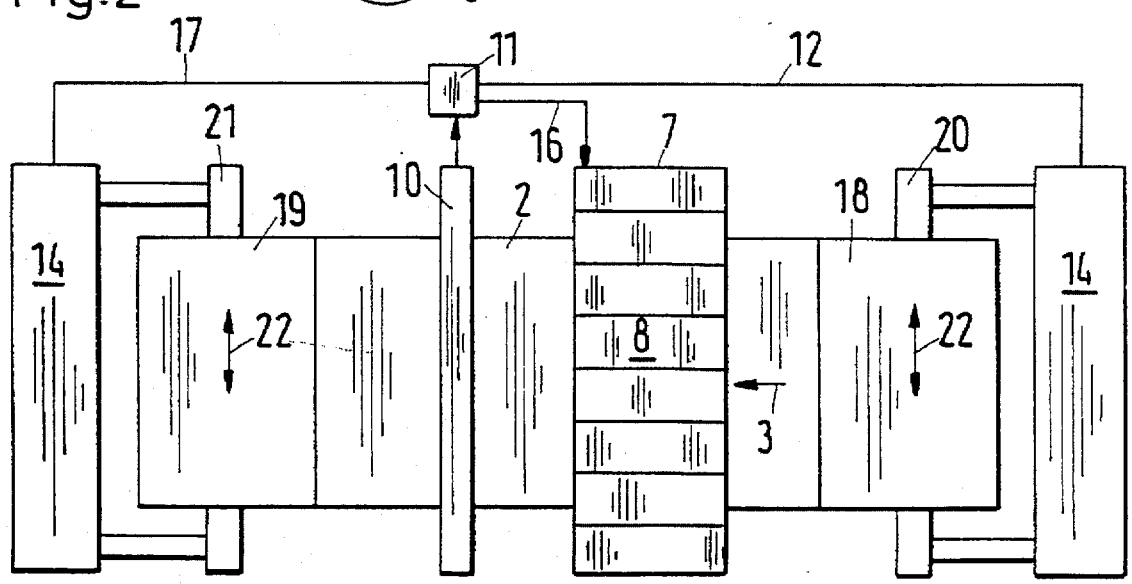
FIG. 2 is a schematic top view of an alternate embodiment of an apparatus for processing a traveling web of material using a sheet treating device according to the present invention.

To alleviate this problem, the sheet treating device 7 of the present invention is suspended from slide rods 12, 13 and thus, can be shifted transversely to the direction of movement 3 of the web 2 (i.e., in the direction indicated by arrow 22 in FIG. 2). The amount of shift is controlled by a driving device 14. The driving device 14 includes a reciprocating drive arm 15, which moves the sheet treating device 7 back and forth along slide rods 12, 13. The length of the stroke of the drive arm 15 is preferably at least equal to the width of one zone 8. The sheet treating device 7 is capable of being moved from a neutral position at least a half zone width toward the driving device 14, as well as at least a half zone width away from the driving device 14.

In operation, web 2 is unwound from a first roller 18, guided through roller gap 6, through measuring bridge 10 and is wound onto a second roller 19. The preferred thickness of the web 2 is predetermined and input into the evaluation device 11. Measurement bridge 10 measures the thickness of the web at a plurality of positions across the width of the web and sends a signal to the evaluation device 11, which is representative of the actual thickness of the web. Evaluation device 11 calculates the difference between the actual thickness and the desired thickness. Based on this difference, which is calculated for a plurality of points across the width of the web, the evaluation device 11 sends a signal to the sheet treating device 7 to control the individual zones 8 to minimize the differences between the actual measured profile and the desired profile. Thereafter, the evaluation device sends a signal to adjust the position of the sheet treating device 7 with respect to the web 2. The position of the sheet treating device 7, and thus of the individual zones 8, is adjusted to minimize the differences between the actual thickness and the desired thickness. One known mathematical method for measuring the differences is the well known least squares method. Of course, other methods for determining the differences can also be used. The sheet treating device 7 is moved transversely to the web 2 from a first position to a second position such that the center of one of the closest zones 8 is moved to a position disposed above and corresponding to the location of the greatest difference between the desired thickness value and the actual thickness value.

Due to the shifting of the sheet treating device 7 to the second position the measured thickness values of the web 2 will change. In the second position, the least squares method (or other deviation measuring formula) is used once again to determine the least squares value corresponding to this position. The value of the least squares from the first position is compared with the value of the least squares from the second position. If the second position value is greater than the first position value, the sheet treating device 7 is repositioned to the first position where the differences between desired thickness and actual thickness are minimized. If, however, the second position value is smaller than the first position value, the process is reiterated for at least one more time. That is, the location of the greatest thickness differential is again determined and the sheet treating device 7 is moved from the second position to a third position such that the center of the closest particular zone is positioned directly over the location of the greatest thickness differential. After the sheet treating device 7 is in the third position, the least squares value of the third position is determined and compared to the least squares value of the second position. If the third position value is greater than the second position value, the sheet treating device is repositioned to the second position where the differences between the desired thickness and the actual thickness are minimized. If the third position value is smaller than the second position value, the process is repeated and the sheet treating device is moved to a fourth position. This reiterative process continues until the least squares value of the last position is greater than the least squares value of the immediately preceding position. The sheet treating device will then be set in the immediately preceding position. In this way, the optimum location of device 7 to minimize the differences between the desired thickness and the actual thickness, is achieved in an iterative fashion.

The sheet treating device 7 indirectly adjusts the thickness of the web 2 through rollers 4, 5. However, the thickness of the web 2 can also be directly adjusted by positioning the sheet treating device 7 so that it acts directly on the web 2. The sheetmaking device 7 can, for example, apply heat or moisture to web 2. Thus, parameters other than the thickness of the web, for example, the smoothness or sheen may be affected in the roller gap 6 between the rollers 4, 5 and controlled and minimized by the reiterative process described above. During the manufacture of the web 2, a material winding screen can also be used as the sheet treating device 7. The material winding screen has several spindles distributed in the transverse direction, which adjust the weight per unit area (i.e., the density) of the web.

In the embodiment illustrated in FIG. 1, the sheet treating device 7 is moved transversely, while the longitudinally running web 2 runs in the longitudinal direction 3, but is stationary with respect to the transverse direction 22. However, in FIG. 2, an alternate embodiment is shown in which the sheet treating device 7 is stationary in the transverse direction while the web 2 can be moved transversely. Referring to FIG. 2, the web 2 is unwound from a first roller 18 and wound onto a second roller 19. The first roller 18 is suspended from an unwinding roller frame 20 and the second roller 19 is suspended from a winding roller frame 21, both of which can move in a coordinated manner in the transverse direction 22 due to the driving actuation of device 14. As a result, both rollers 18, 19 can move in the transverse direction 22. The control of the driving means 14 is carried out by the evaluation device 11, which also controls the individual zones 8 of the sheet treating device 7. Preferably, the evaluation device 11 is connected with the sheetmaking device 7 by a control line 16 to control the individual zones 8. Device 11 is connected to the driving device 14 by a control line 17.

Figure 3:
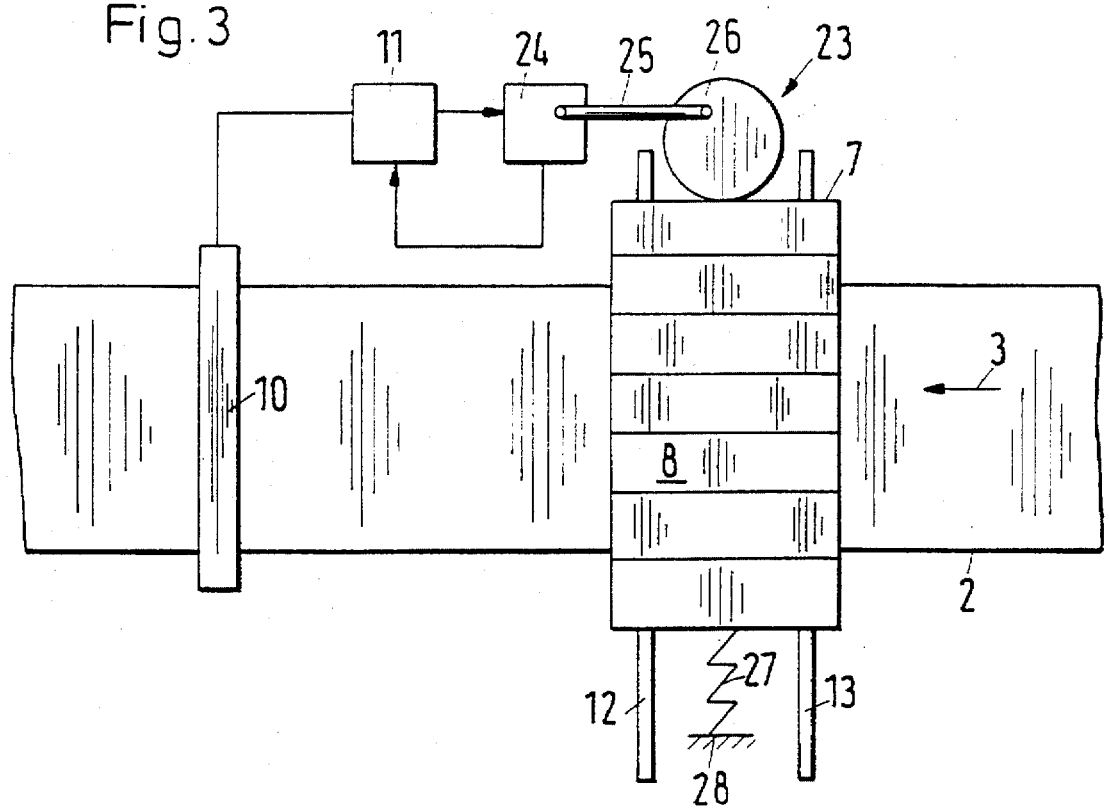
FIG. 3 is a top view of an apparatus for processing a web of material with a schematic representation of a preferred driving means according to the present invention.

Referring now to FIG. 3, a driving device 23 is movably suspended from slide rods 12, 13 for moving the sheet treating device 7. The slide rods 12, 13 extend transversely in relation to the direction of movement 3 of the web 2 as in FIG. 1. The driving device 23 has a stepping motor 24, which is connected by a drive shaft 25 to an eccentric disk 26. The sheet treating device 7 engages the eccentric disk 26 due to the biasing force of a spring 27, which is located between the sheet treating device 7 and a stationary wall 28. The position of the stepping motor 24 is monitored and controlled by the evaluation device 11. Since the angular position of the stepping motor 24 correlates directly to the angular position of the eccentric disk 26, the evaluation device 11 discerns the position of the sheet treating device 7 at all times.

Figure 4:
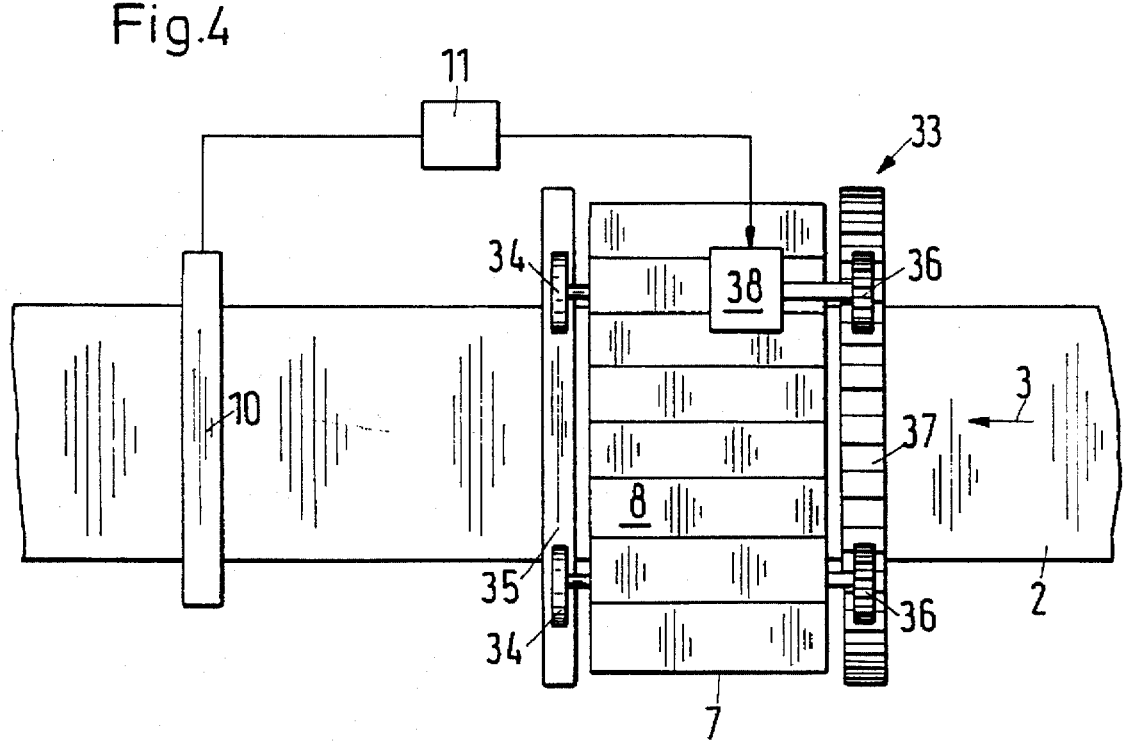
FIG. 4 is a top view of the apparatus of FIG. 3, with an alternate driving means according to the present invention.

Referring now to FIG. 4, an alternate driving device 33 for the sheet treating device 7 is shown. In this case, the sheet treating device 7 is supported on a nil 35 by two wheels 34 and on a toothed rack 37 by two pinion gears 36. One of the two pinion gears 36 is driven by a stepping motor 38, which is in turn controlled by the evaluation device 11.

While the embodiment of the invention shown and described is fully capable of achieving the results desired, it is to be understood that this embodiment has been shown and described for purposes of illustration only and not for purposes of limitation. The invention is limited only by the appended claims.

What is claimed is:

1. A method for processing a web of material which travels along a longitudinal path, using a sheet treating device having individually controllable zones positioned in a direction transverse to the web's path, comprising the steps of:

(a) establishing a desired profile of a predetermined target parameter of the web;

(b) measuring an actual profile of the predetermined target parameter of the web in the transverse direction downstream of the sheet treating device;

(c) comparing the actual profile with the desired profile of the predetermined target parameter;

(d) controlling the individually controllable zones of the sheet treating device to minimize the differences between the actual profile and the desired profile; and (e) shifting at least one of the sheet treating device and the web relative to the other one of the sheet treating device and the web in the transverse direction from a first position to a second position to minimize the differences between the actual profile and the desired profile.

2. The method of claim 1, wherein, before said shifting step, each zone is controlled such that the difference between the desired profile and the actual profile is minimized.

3. The method of claim 1, wherein said shifting step includes shifting the at least one of the sheet treating device and the web such that at least one of a predetermined point of a zone is moved to the location of the greatest difference between the desired profile and the actual profile.

4. The method of claim 3, wherein the predetermined point of the zone is the center of the zone.

5. The method of claim 3, after said shifting step, further comprising the steps of:

(a) determining a first least squares value corresponding to the difference between the desired profile and the actual profile in the previous position;

(b) determining a second least squares value corresponding to the differences between the desired profile and the actual profile in the current position;

(c) comparing the fast least squares value to the second least squares value;

(d) determining the location of the greatest difference between the desired profile and actual profile if the second value is smaller than the first value;

(e) shifting the predetermined point of one of the zones directly over the location of the greatest difference by shifting the at least one of the sheet treating device and the web relative to the other from a current position to a next position, if the second value is smaller than the fast value;

(f) repositioning the one of the sheet treating device and the web to the previous position if the second value is larger than the first value; and (g) repeating steps (a) through (f) until step (f) is satisfied.

* * * * *